United States Patent
Woehlke et al.

(10) Patent No.: US 11,934,176 B2
(45) Date of Patent: Mar. 19, 2024

(54) DEVICE AND METHOD FOR CONTROLLING A ROBOT

(71) Applicant: Robert Bosch GmbH, Stuttgart (DE)

(72) Inventors: Jan Guenter Woehlke, Leonberg (DE); Felix Schmitt, Ludwigsburg (DE); Herke Van Hoof, Diemen (NL)

(73) Assignee: ROBERT BOSCH GMBH, Stuttgart (DE)

( * ) Notice: Subject to any disclaimer, the term of this patent is extended or adjusted under 35 U.S.C. 154(b) by 462 days.

(21) Appl. No.: 17/231,786

(22) Filed: Apr. 15, 2021

(65) Prior Publication Data
US 2021/0341904 A1 Nov. 4, 2021

(30) Foreign Application Priority Data
Apr. 30, 2020 (EP) .................................... 20172448

(51) Int. Cl.
*G05B 19/41* (2006.01)
*G05B 19/4155* (2006.01)
(Continued)

(52) U.S. Cl.
CPC ....... *G05B 19/4155* (2013.01); *G05D 1/0214* (2013.01); *G05D 1/0221* (2013.01);
(Continued)

(58) Field of Classification Search
CPC .............. G05B 13/029; G05B 19/4155; G05B 2219/33002; G05B 2219/39271;
(Continued)

(56) References Cited

U.S. PATENT DOCUMENTS

| | | | |
|---|---|---|---|
| 10,730,181 B1 * | 8/2020 | Rajkumar | G06N 3/045 |
| 11,531,358 B2 * | 12/2022 | White | G08G 5/0026 |
| 2014/0249676 A1 * | 9/2014 | Florencio | G06N 3/008 |
| | | | 700/258 |

(Continued)

OTHER PUBLICATIONS

Jendele et al., "Learning Functionally Decomposed Hierarchies for Continuous Control Tasks," Cornell University, 2020, pp. 1-16.
Nardelli, et al., "Value Propagation Networks," Cornell University, 2019, pp. 1-13.
Tamar, et al., "Value Iteration Networks," 30th Conference on Neural Information Processing Systems (NIPS), 2017, pp. 1-16.
(Continued)

*Primary Examiner* — Tyler J Lee
(74) *Attorney, Agent, or Firm* — NORTON ROSE FULBRIGHT US LLP; Gerard A. Messina

(57) ABSTRACT

A method for controlling a robot. The method includes receiving an indication of a target configuration to be reached from an initial configuration of the robot, determining a coarse-scale value map by value iteration, starting from an initial coarse-scale state and until the robot reaches the target configuration or a maximum number of fine-scale states has been reached, determining a fine-scale sub-goal from the coarse-scale value map, performing, by an actuator of the robot, fine-scale control actions to reach the determined fine-scale sub-goal and obtaining sensor data to determine the fine-scale states reached, starting from a current fine-scale state of the robot and until the robot reaches the determined fine-scale sub-goal, the robot transitions to a different coarse-scale state, or a maximum sequence length of the sequence of fine-scale states has been reached and determining the next coarse-scale state.

7 Claims, 2 Drawing Sheets

(51) Int. Cl.
　　　*G05D 1/00*　　　(2006.01)
　　　*G05D 1/02*　　　(2020.01)
　　　*G06N 3/08*　　　(2023.01)
　　　*G06N 7/01*　　　(2023.01)

(52) U.S. Cl.
　　　CPC ............... *G06N 3/08* (2013.01); *G06N 7/01* (2023.01); *G05B 2219/50391* (2013.01); *G05D 1/0088* (2013.01)

(58) Field of Classification Search
　　　CPC ....... G05B 2219/50391; G05D 1/0088; G05D 1/0214; G05D 1/0221; G05D 1/0274; G06N 3/045; G06N 3/08; G06N 7/01
　　　See application file for complete search history.

(56) References Cited

U.S. PATENT DOCUMENTS

| | | | |
|---|---|---|---|
| 2019/0152054 A1* | 5/2019 | Ishikawa | B25J 9/163 |
| 2019/0197396 A1* | 6/2019 | Rajkumar | G06N 3/08 |
| 2020/0311616 A1* | 10/2020 | Rajkumar | G06N 3/008 |
| 2021/0109834 A1* | 4/2021 | Singh | G06F 11/327 |
| 2021/0165426 A1* | 6/2021 | White | G01C 21/3804 |
| 2021/0325907 A1* | 10/2021 | White | G08G 5/0091 |

OTHER PUBLICATIONS

Matthias Rungger et al., "Multiscale Anticipatory Behavior by Hierarchical Reinforcement Learning," Springer-Verlag, 2009, pp. 301-320.

\* cited by examiner

DEVICE AND METHOD FOR CONTROLLING A ROBOT

CROSS REFERENCE

The present application claims the benefit under 35 U.S.C. § 119 of European Patent Application No. EP 20172448.1 filed on Apr. 30, 2020, which is expressly incorporated herein by reference in its entirety.

FIELD

The present disclosure relates to devices and methods for controlling a robot.

BACKGROUND INFORMATION

Reinforcement Learning (RL) is a machine learning paradigm that allows a machine to learn to perform desired behaviours with respect to a task specification, e.g., which control actions to take to reach a goal location in a robotic navigation scenario. Learning a policy that generates these behaviours with reinforcement learning differs from learning it with supervised learning in the way the training data is composed and obtained: While in supervised learning the provided training data consists of matched pairs of inputs to the policy (e.g., observations like sensory readings) and desired outputs (actions to be taken), there is no fixed training data provided in case of reinforcement learning. The policy is learned from experience data gathered by interaction of the machine with its environment whereby a feedback (reward) signal is provided to the machine that scores/asses the actions taken in a certain context (state).

The data-efficiency of RL algorithms is low in case the provided reward signal is very sparse. As a result, the training to meet a certain quality criterion with the trained control policy may take very long.

The paper "Value Iteration Networks" by Tamar et al., Mar. 20, 2017, describes Value Iteration Networks (VIN) as a fully-differentiable planning module that learns an approximation of a value iteration planning algorithm. In a continuous control task, they hierarchically combine high-level VIN planning on a discrete, coarse, grid representation of the continuous environment with a low-level continuous control policy trained via guided policy search. The low-level policy receives a local excerpt of the value function (map) generated by the VIN planner as additional input.

The HiDe algorithm described in "Learning Functionally Decomposed Hierarchies for Continuous Navigation Tasks" by Jendele et al., Sep. 25, 2019, hierarchically combines Value Propagation Networks (VProp), an improvement of VIN, with reinforcement learning for solving continuous state and action space robotic navigation tasks. The high-level VProp planner generates sub-goals for the low-level reinforcement learning. The VProp planner receives a 2D bird's-eye view image (coarse, discrete map representation) of the environment as input and calculates a value map as output. The current 2D position of the agent falls into one of the discrete cells. The next target cell for the low-level (RL) policy is selected by choosing the neighboring cell with the highest value in the value map. By subtracting the current 2D position from the target grid cell position, a target vector is generated. This target vector is refined by an 'interface layer policy' before being provided as an input to the low-level continuous control RL policy that additionally receives the internal agent state as an input and calculates the continuous actions applied to the actuators of the agent. The whole hierarchical 3-level planning/policy is trained end-to-end via reinforcement learning.

However, end-to-end reinforcement learning including learning the value iteration procedure itself requires a substantial training effort and in particular high amounts of training data.

In view of the above, more data-efficient approaches for controlling a robot are desirable.

SUMMARY

The method and the device in accordance with example embodiment of the present invention may allow controlling a robot by training with less observation data since only a transition probability model needs to be learned for the high-level planner (e.g., using supervised learning) as opposed to learning the value iteration procedure itself end-to-end (like in the HiDe approach mentioned above) with the low-level continuous control policy via reinforcement learning, which is a more difficult learning task (since a transition and reward function also have to be learned implicitly).

Example embodiments of the present invention may also be computationally more efficient than approaches learning a value iteration model (such as HiDe) since no backpropagation of gradients through the planner via the continuous control policy to update the (recurrent) planner is necessary.

In the following, exemplary embodiments of the present invention provided.

Example 1 is a method for controlling a robot comprising receiving an indication of a target configuration (state) to be reached from an initial configuration (state) of the robot, determining a coarse-scale value map by value iteration, wherein the transition probabilities are determined using a transition probability model mapping coarse-scale states and coarse-scale actions to transition probabilities for coarse-scale states and for each coarse-scale state of a sequence of coarse-scale states of the robot, starting from an initial coarse-scale state determined from the initial configuration (state) of the robot and until the robot reaches the target configuration (state) or a maximum number of fine-scale states has been reached, determining a fine-scale sub-goal from the coarse-scale value map, performing, by an actuator of the robot, fine-scale control actions to reach the determined fine-scale sub-goal and obtaining sensor data to determine the fine-scale states reached as a result of performing the fine-scale control actions for each fine-scale state of the resulting sequence of fine-scale states of the robot, starting from a current fine-scale state of the robot and until the robot reaches the determined fine-scale sub-goal, the robot transitions to a different coarse-scale state, or a maximum sequence length of the sequence of fine-scale states has been reached and determining the next coarse-scale state of the sequence of coarse-scale states from the last fine-scale state of the sequence of fine-scale states.

Example 2 is the method of Example 1, wherein the transition probability model is a model trainable by supervised learning.

Example 3 is the method of Example 1 or 2, wherein the transition probability model is a neural network.

Using a model trainable by supervised learning such as a neural network for determining transition probabilities allows usage of value iteration planning on the high-level (i.e., coarse-scale) and thus a data-efficient training of the robot control.

Example 4 is a robot controller configured to perform a method of any one of Examples 1 to Example 3.

Example 5 is a method for training a robot controller according to Example 4.

Example 6 is the method for training a robot controller of Example 5 comprising training the transition probability model using supervised learning.

As mentioned above, learning a transition probability model for the value iteration using supervised learning is more data-efficient than learning to approximately perform the value iteration algorithm (which implicitly includes learning transition dynamics) end-to-end with the low-level control policy via reinforcement learning.

Example 7 is the method for training a robot controller of Example 6, comprising training the transition probability model by maximizing the probability of the transition probability model to predict a coarse-scale state reached by fine-scale actions performed to reach a sub-goal.

Training the transition probability model in this manner allows training the high-level planner together with performing reinforcement learning for the low-level policy, i.e., learning of the low-level control policy by performing training rollouts to gather data to update the policy.

Example 8 is the method for training a robot controller of any one of Examples 5 to 7, comprising training a fine-scale control policy via reinforcement learning that determines the fine-scale control actions to reach a sub-goal.

The low-level control can thus be trained using a reinforcement learning approach of choice (such as Q-learning, Deep Q-learning (DQN), Trust Region Policy Optimization (TRPO), Proximal Policy Optimization (PPO), Deep Deterministic Policy Gradient (DDPG), Twin Delayed DDPG (TD3), (Asynchronous) Advantage Actor Critic (A2C/A3C)).

Example 9 is a computer program comprising instructions which, when executed by a computer, makes the computer perform a method according to any one of Examples 1 to 3 or 5 to 8.

Example 10 is a computer-readable medium comprising instructions which, when executed by a computer, makes the computer perform a method according to any one of Examples 1 to 3 or 5 to 8.

BRIEF DESCRIPTION OF THE DRAWINGS

In the figures, similar reference characters generally refer to the same parts throughout the different views. The figures are not necessarily to scale, emphasis instead generally being placed upon illustrating features of the present invention. In the description below, various aspects of the present invention are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples of the present invention are described in more detail.

Figure 1:
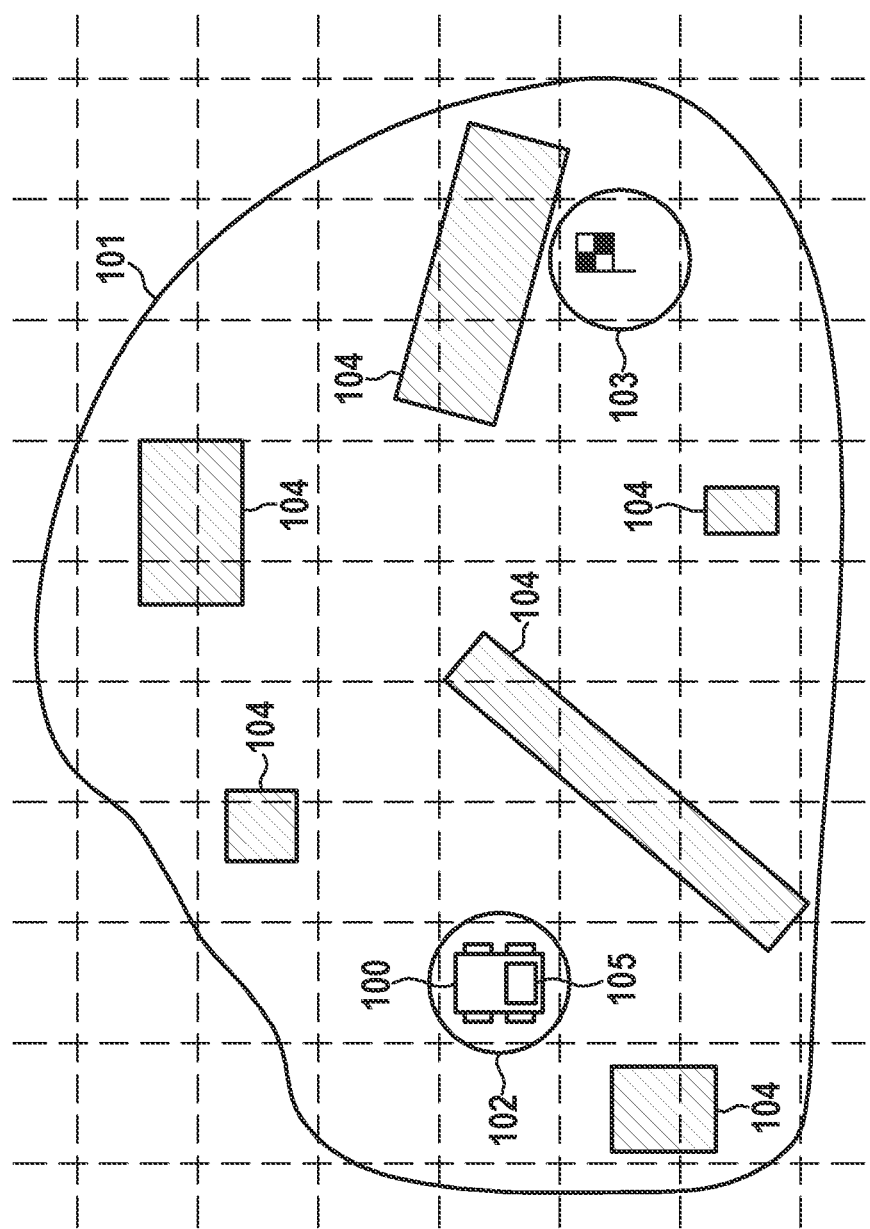
FIG. 1 shows a control scenario according to an example embodiment of the present invention.

FIG. 1 shows a control scenario.

A robot 100 is located in an environment 101. The robot 100 has a start position 102 and should reach a goal position 103. The environment 101 contains obstacles 104 which should be avoided by the robot 100. For example, they may not be passed by the robot 100 (e.g., they are walls, trees or rocks) or should be avoided because the robot would damage or hurt them (e.g., pedestrians).

The robot 100 has a controller 105 (which may also be remote to the robot 100, i.e., the robot 100 may be controlled by remote control). In the exemplary scenario of FIG. 1, the goal is that the controller 105 controls the robot 100 to navigate the environment 101 from the start position 102 to the goal position 103. For example, the robot 100 is an autonomous vehicle but it may also be a robot with legs or tracks or other kind of propulsion system (such as a deep sea or mars rover).

Furthermore, embodiments are not limited to the scenario that a robot should be moved (as a whole) between positions 102, 103 but may also be used for the control of a robotic arm whose end-effector should be moved between positions 102, 103 (without hitting obstacles 104) etc.

Ideally, the controller 105 has learned a control policy that allows it to control the robot 101 successfully (from start position 102 to goal position 103 without hitting obstacles 104) for arbitrary scenarios (i.e., environments, start and goal positions) in particular scenarios that the controller 105 has not encountered before.

Various embodiments thus relate to learning a control policy for a specified (distribution of) task(s) by interacting with the environment 101. In training, the scenario (in particular environment 101) may be simulated but it will typically be real in deployment.

Reinforcement Learning (RL) is a technique for learning a control policy. An RL algorithm iteratively updates the parameters θ of a parametric policy $\pi_\theta(a|s)$, for example represented by a neural network, that maps states s (e.g., (pre-processed) sensor signals) to actions a (control signals). During training, the policy interacts in rollouts episodically with the (possibly simulated) environment 101. During a (simulated training) rollout in the environment 101, the controller 105, according to a current control policy, executes, in every discrete time step an action a according to the current state s, which leads to a new state s' in the next discrete time step. Furthermore, a reward r is received, which it uses to update the policy. A (training) rollout ends once a goal state is reached, the accumulated (potentially discounted) rewards surpass a threshold, or the maximum number of time steps, the time horizon T, is reached. During training a reward-dependent objective function (e.g., the discounted sum of rewards received during a rollout) is maximized by updating the parameters of the policy. The training ends once the policy meets a certain quality criterion with respect to the objective function, a maximum number of policy updates have been performed, or a maximum number of steps have been taken in the (simulation) environment.

The data-efficiency of RL algorithms is low in case the provided reward signal is very sparse: For example, a binary reward that indicates task completion is only provided at the end of the interaction episodes. As a result, the training to meet a certain quality criterion with the policy may take very long, requiring many interaction steps in the (simulation) environment and/or policy updates, or fail.

Assuming some prior knowledge about the (simulated) environment (e.g., the availability of a map in case of an robot/vehicle navigation task), the combination of a planning algorithm that guides the reinforcement learning may be used in order to improve data-efficiency.

According to various embodiments, the controller 105 uses high-level planning on a coarse, discrete (map) representation of the environment 101 to set (relative) sub-goals (target vectors) for a low-level controller trained via reinforcement learning that acts in the continuous state and action space of the environment 101. The coarse, discrete representation of the environment is for example a grid 106 (shown as dashed lines in FIG. 1) wherein each tile of the grid 106 is a state in the coarse representation of the environment. High-level is also referred to as coarse-scale. Low-level learning operates on a practically "continuous" (e.g., up to calculation or number representation accuracy) scale, i.e., a much finer representation. Low-level is also referred to as fine-scale. For example, for an autonomous driving scenario, the tiles of the grid 106 are 10 meters×10 meters while the low-scale has an accuracy of centimeters, millimeters or even below.

Instead of trying to solve the difficult learning problem of learning a high-level planner and a low-level policy end-to-end via reinforcement learning, the learning of the planner and the policy parameters, respectively, is split into two (related) problems: planner parameters (representing the transition probabilities between high-level (i.e., coarse-scale) states) are inferred via supervised learning, which is a simpler learning problem than reinforcement learning, and the policy parameters are learned via reinforcement learning. Unlike the HiDe approach described above, the exact value iteration planning algorithm is used instead of a learned approximation (VIN/VProp). For this a model of the transition probabilities of transitioning between the coarse, discrete high-level states given a chosen neighboring target coarse-scale state and the current low-level reinforcement learning policy is trained and used. This transition probability model reflects the current capabilities of the low-level reinforcement learning agent. It is learned from the data gathered during the reinforcement learning episodes. Different types of transition probability models are in principle possible. Specifically, according to various embodiments, a parametric model (neural network) is trained (whose parameters are the parameters of the planner) by supervised learning that works with local agent observation features and thereby generalizes across different environment layouts.

In the following, embodiments may be described in more detail.

Task

Consider a distribution of Markov Decision Processes (MDPs) $\mathcal{M}$ that share the same state space $\mathcal{S} \subseteq \mathbb{R}^n$ and action space $\mathcal{A} \subseteq \mathbb{R}^u$. Specific MDPs m=($\mathcal{S}_m$, $\mathcal{A}$, $\mathcal{P}_m$, $r_m$, $\gamma$, T) may be sampled. Start state $s_{0,m}$ and goal state $g_m$ are sampled from the MDP specific state space $\mathcal{S}_m \subseteq \mathcal{S}$. The (goal-dependent) reward function is of the following form: $r_m(s, g_m) = \mathbb{1}_{d(s,g_m) \leq \varepsilon}$ with d(.,.) being some distance measure such that there is only a reward of 1 in case the goal (i.e., target) has been reached (wherein $\varepsilon$ is a small number, e.g., dimensioned to avoid that the distance has to become exactly zero). $\mathcal{P}_m$ are the MDP specific transition dynamics that model the transition from a state s to the next state s' given as a result of action a. $\gamma$ is the discount factor and T the time horizon (maximum amount of steps to reach the goal state 103 from the start state 102).

Objective

It is the objective to maximize the rewards (for task completion) in expectation for randomly sampled MDPs m with uniformly sampled start and goal states:

$$\max_{\theta,\psi} \mathbb{E}_{m \sim \mathcal{M}, s_{0,m} \sim \mathcal{U}(\mathcal{S}_m), g_m \sim \mathcal{U}(\mathcal{S}_m)}[r_m(s, g_m) | \mathcal{P}_m, \pi_\theta, \psi]$$

Hierarchical State and Action Space

The continuous low-level state space $\mathcal{S}$ is split into an external part $\mathcal{S}_{ext} \subseteq \mathbb{R}^{n_{ext}}$ that describes the agent (e.g., robot 101) in its environment (e.g., agent position) and an internal part $\mathcal{S}_{int} \subseteq \mathbb{R}^{n_{int}}$ that describes the internal state of the agent (e.g., joint angles of the robot 101), with $\mathcal{S} = \mathcal{S}_{ext} \otimes \mathcal{S}_{int}$, where $\otimes$ denotes the cartesian product. A surjective mapping $z = f_Z(s) = f_Z(s_{ext})$ transforms the continuous low-level state space $\mathcal{S}$ into a finite high-level state space $\mathcal{Z}$. Another mapping $\tilde{s}_{ext} = f_{S_{ext}}(z)$ transforms high-level states back to reference external low-level states $\tilde{s}_{ext}$. The high-level action space consists of a finite number of temporally extended options $o \in \mathcal{O}$ (which can be seen to correspond to subgoals). The ideal/intended outcome (next high-level state) of taking option o in high-level state z is denoted as $\bar{z}(z, o)$.

Low-Level Reinforcement Learning

The agent perceives local feature observations $\phi(s_{ext})$ based on its external state. For example, the robot 101 has sensors observing the robot's vicinity, e.g., the presence of obstacles 104 in its vicinity. In particular, for each coarse-scale (i.e., high-level) state z (robot position on the coarse grid) there may be a feature observation $\phi(f_{S_{ext}}(z))$ which may for example include information for each tile of a part of the coarse grid 106 around the robot 101 (e.g., in a 3×3 section of the coarse grid 106 with the robot at its centre). This may for example include information about the presence of obstacles in the respective coarse-grid tile, the type of tile (e.g., rough terrain, smooth terrain). A feature observation may also include other information of a coarse-scale state such as speed and orientation of the robot 101.

The option-dependent low-level policy denotes $\pi_\theta^o(a|\phi(s_{ext}), s_{int}, \tau(o, s_{ext}))$ with $\tau(o, s_{ext})$ being the option-dependent target vector from the current external state to the sub-goal: $\tau(o, s_{ext}) = f_{S_{ext}}(\bar{z}(f_Z(s_{ext}), o)) - s_{ext}$.

The initiation set denotes $\mathcal{I}^o = \mathcal{S}_m$; any option can be selected everywhere.

The termination function denotes $$\beta^o(s_t, s_{t-1}) = \mathbb{1}_{f_Z(s_t) \neq f_Z(s_{t-1})}.$$

The option-dependent (sub-goal) reward function for the low-level reinforcement learning policy denotes $$r^o(s, o) = \mathbb{1}_{f_Z(s) = \bar{z}(f_Z(s_0^o), o)}$$

with $s_0^o$ being the agent state when option o was selected.

The low level-reinforcement learning policy $\pi_\theta$ is trained using the sub-episodes that arise within the training episodes of horizon T from repeated option activation and termination. Therefore, the execution of an option o has a variable maximum time horizon $T_o=T-t_o$ that depends on the time step $t_o$ at which the option was activated.

High-Level (Value Iteration) Planning

Value iteration iteratively refines an estimate of the state value function V or the state-action value function Q. Let $V_k$ be the state value function of the kth iteration and let $Q_k$ be the state-action value function Q of the kth iteration. These can be defined recursively. The value iteration starts with an arbitrary function (which can be seen as an initial guess) $V_0$. Value iteration uses the following equations to get the functions for k+1

$$Q_{k+1}(s, a) = R(s, a) + \gamma^* \sum_{s'} P(s' \mid s, a)^* V_k(s')$$

$$V_k(s) = \max_a Q_k(s, a)$$

P(s'|s, a) represents the transition dynamics to reach a next state s' from current states given the action a.

When the high-level states $z = f_Z(s)$ that correspond to the states s of a rollout of the low-level policy $\pi_\theta$ are considered, it can be observed that the high-level states follow the transition dynamics $\mathcal{P}(z'|z, o)$ that depend on the low-level policy $\pi_\theta$. A parametric model $\hat{p}_\psi$ with parameters $\psi$, which models these transition dynamics sufficiently well, is learned from data. In order to generalize across the MDPs within the distribution $\mathcal{M}$, the model is learned with respect to the feature observations corresponding to the high-level states: $\hat{p}_\psi(\phi(f_{S_{ext}}(z'))|\phi(f_{S_{ext}}(z)), o, \pi_\theta)$.

The high-level planner runs value iteration to obtain the value map $V_{z,o}(z)$. Options, which implicitly define sub-goals for the lower-level reinforcement learning, are greedily selected by the policy over options $$\omega(o \mid z) := \arg\max_{o \in O} V_{z,o}(z(z, o)).$$

Objective Revisited

As a result, the reward maximization in the objective is with respect to the parameters of the low-level reinforcement learning policy $\theta$ and the parameters of (the learned high-level transition dynamics model for the) the high-level (value iteration) planner $\psi$:

$$\max_{\theta, \psi} \mathbb{E}_{m \sim \mathcal{M}, s_{o,m} \sim \mathcal{U}(S_m), g_m \sim \mathcal{U}(S_m)}[r_m(s, g_m) \mid \mathcal{P}_m, \pi_\theta, \psi]$$

Components

According to various example embodiments of the present invention, the controller 105 applies a hierarchical planning-guided RL control policy that comprises a high-level (coarse-scale) value iteration planner and a low-level (fine-scale) policy trained via reinforcement learning.

The high-level value iteration planner carriers out value iteration planning in a coarse state space abstraction (high-level state space). Sub-goals for the low-level reinforcement learning are generated by selecting high-level actions (options) based on the generated (high-level) value map. The high-level planning maintains a transition probability model for the coarse-scale state space. This model may be of specific architecture as follows.

Figure 2:
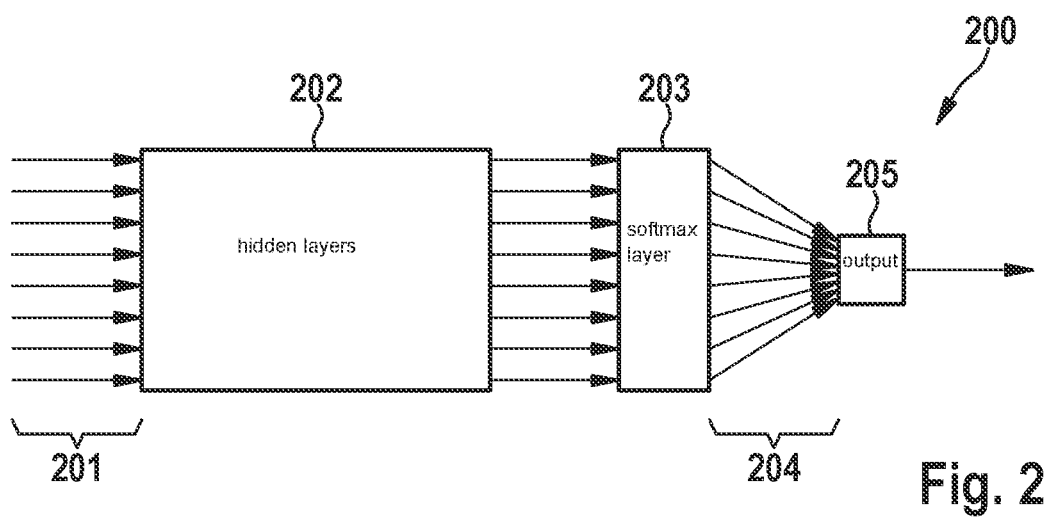
FIG. 2 shows a neural network for predicting high-level states, in accordance with an example embodiment of the present invention.

FIG. 2 shows a neural network 200 for predicting high-level states.

The neural network 200 implements a classifier that predicts the next high-level state by selecting one of the (fixed amount of) neighboring high-level states provided, as input 201, the current high-level state (in terms of a feature observation for the current high-level state) and the selected option (from which the sub-goal for the low-level reinforcement learning is derived). The neural network 200 includes a plurality of hidden layers 202 followed by a softmax layer 203. The softmax probabilities 204 of the classifier are used as transition probabilities 204 to all possible neighboring high-level states and are used to determine the neural network's output 205.

The low-level RL module includes the control policy that interacts with the environment and is rewarded for achieving the sub-goals set by the high-level planning. It may be trained by a reinforcement learning algorithm of choice, e.g., Q-learning, Deep Q-learning (DQN), Trust Region Policy Optimization (TRPO), Proximal Policy Optimization (PPO), Deep Deterministic Policy Gradient (DDPG), Twin Delayed DDPG (TD3), (Asynchronous) Advantage Actor Critic (A2C/A3C), etc.

Training

The hierarchical policy is trained for several training iterations until a maximum number of training iterations is reached or it meets a pre-defined quality criterion with respect to the objective function. In every iteration:

I. Data is gathered by interacting with the (simulation) environment(s) for a number of episodes. In every episode:
   a. The specific (simulation) environment is provided/sampled as well as the start state and the desired goal state of the agent.
   b. Given the coarse representation of the environment, the desired agent goal state, and the current transition probability model, the value iteration planner is run, which generates a value map for the high-level states.
   c. Starting in the start state and being provided the initial sub-goal high-level state from the high-level planner, which is determined based on the initial agent state and the value map as one of the neighboring high-level states, the agent interacts with the (simulation) environment until the goal state is reached or the maximum interaction step number (time horizon) is reached. In every interaction step:
     i. The agent receives some observation (potentially pre-processed sensory information).
     ii. Based on the observation, the internal state of the agent, and the current sub-goal, the low-level RL policy calculates a control signal (action).
     iii. The control signal (action) is applied to the actuators of the agent.
     iv. As a result, the agent/environment is in a new state and the reward for this transition is provided by the (sub-goal-dependent) low-level reward function.
     v. The low-level transition <state, action, new state, reward> is stored in a low-level transition buffer. If not done in vi., the high-level transition <high-level state (feature observation), option (high level action), new high-level state (feature observation)> is stored in a high-level transition buffer.
     vi. If either the sub-goal high-level state is reached or the agent transitions to a wrong high-level state, the high-level planner provides a new sub-goal high-level state based on the current high-level state and the value map as one of the neighboring high-level states. If not done in v., the high-level transition <high-level state (feature observation), option (high level action), new high-level state (feature observation)> is stored in a high-level transition buffer.

If the maximum interaction step number (time horizon) is reached and the high-level transition has not been stored in v., the high-level transition <high-level state (feature observation), option (high level action), new high-level state (feature observation)> is stored in a high-level transition buffer.

II. The low-level reinforcement learning policy is updated using the data in the low-level transition buffer using the reinforcement learning algorithm of choice.

III. The transition probability model parameters are updated using the data in the high-level transition buffer. In case of the specific neural network architecture of FIG. 2, the network parameters are iteratively updated by an optimizer that—maximizes the prediction probability of the actual new high-level state given the high-level state (feature observation) and the option (high-level action) as network input.

Deployment

Once the hierarchical policy is trained, the controller 105 performs the following during deployment:

I. The specific (simulation) environment is provided/sampled as well as the start state and the desired goal state of the agent.

II. Given the coarse representation of the environment, the desired agent goal state, and the current transition probability model, the value iteration planner is run, which generates a value map for the high-level states.

III. Starting in the start state and being provided the initial sub-goal high-level state from the high-level planner, which is determined based on the initial agent state and the value map as one of the neighboring high-level states, the agent interacts with the (simulation) environment until the goal state is reached or the maximum interaction step number (time horizon) is reached. In every interaction step:
  a. The agent receives some observation (potentially pre-processed sensory information).
  b. Based on the observation, the internal state of the agent, and the current sub-goal, the low-level RL policy calculates a control signal (action).
  c. The control signal (action) is applied to the actuators of the agent.
  d. This is repeated until the agent/environment is in a new high-level state.
  e. If either the sub-goal high-level state is reached or the agent has transitioned to a wrong high-level state, the high-level planner provides a new sub-goal high-level state based on the current high-level state and the value map as one of the neighboring high-level states.

Figure 3:
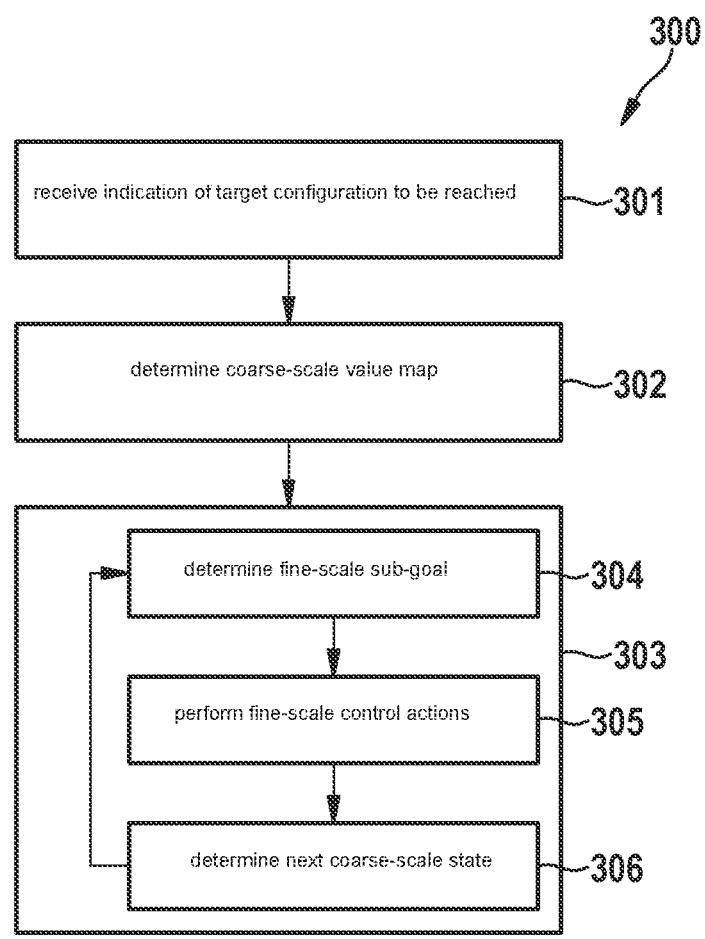
FIG. 3 shows a flow diagram illustrating a method for controlling a robot according to an example embodiment of the present invention.

In summary, according to various embodiments of the present invention, a method for controlling a robot is provided as illustrated in FIG. 3.

FIG. 3 shows a flow diagram 300 illustrating a method for controlling a robot.

In 301, an indication of a target configuration to be reached from an initial configuration of the robot is received.

In 302, a coarse-scale value map is determined by value iteration, wherein the transition probabilities are determined using a transition probability model mapping coarse-scale states and coarse-scale actions to transition probabilities for coarse-scale states.

In 303, for each coarse-scale state of a sequence of coarse-scale states of the robot, starting from an initial coarse-scale state determined from the initial configuration of the robot and until the robot reaches the target configuration or a maximum number of fine-scale states has been reached, a fine-scale sub-goal from the coarse-scale value map is determined in 304. The fine-scale sub-goal may correspond to a coarse-scale action, e.g., may be a reference fine-scale state for a coarse-scale state (e.g., the coarse-scale state's center in fine-scale coordinates) to be reached the coarse-scale action.

In 305, by an actuator of the robot, fine-scale control actions are performed to reach the determined fine-scale sub-goal and sensor data are obtained to determine the fine-scale states reached as a result of performing the fine-scale control actions for each fine-scale state of the resulting sequence of fine-scale states of the robot, starting from a current fine-scale state (e.g., an initial fine-scale state of the current coarse-scale state) of the robot and until the robot reaches the determined fine-scale sub-goal, the robot transitions to a different coarse-scale state, or a maximum sequence length of the sequence of fine-scale states has been reached.

In 306, the next coarse-scale state of the sequence of coarse-scale states is determined from the last fine-scale state of the sequence of fine-scale states is determined.

According to various embodiments, in other words, robot control is split into (at least) two hierarchy levels, wherein the lower level performs fine-scale control given by a (fine-scale) control policy (trained via reinforcement learning such as Q-learning, Deep Q-learning (DQN), Trust Region Policy Optimization (TRPO), Proximal Policy Optimization (PPO), Deep Deterministic Policy Gradient (DDPG), Twin Delayed DDPG (TD3), (Asynchronous) Advantage Actor Critic (A2C/A3C)) and the higher level, also referred to as planner, performs value iteration. Value iteration can be seen as iterative application of the Bellman equation to generate a value map. The transition probabilities for the value iteration are given by a transition probability model which, according to various embodiments, is trainable by supervised learning, e.g., represented by a neural network. The parameters of the neural network (e.g., the weights), denoted by $\psi$ in the examples above, can be seen as parameters of the planner.

For example, a control signal is determined based on the potentially pre-processed sensory input using the learned (hierarchical) control policy. The high-level planner generates (sub-goal) targets based on the provided coarse environment representation (e.g., map). The low-level control module operating according to the low-level control policy calculates the control signals (for performing the low-level control actions) given these targets and the potentially pre-processed sensory input.

In case of vehicles (e.g., cars) or mobile robots, the coarse environment representation for the high level planner is for example a map (indicating obstacles) that is tiled such that a finite number of cells result, which are the potential sub-goals. The target vectors (i.e., the sub-goals) are for example the difference between the position of the center of the chosen cell and the current vehicle position. The low-level control module operating according to the low-level control policy receives this target vector along with the current potentially pre-processed sensory readings.

In case of a robotic task, the high-level planner may receive some sort of symbolic representation of the task (e.g., known subtasks that need to be fulfilled: mount a screw, move an object, . . . ) as coarse environment representation. It then generates a plan that sequences these sub-tasks (or maybe positional offset vectors for certain objects) which are the targets, i.e., the sub-goals, for the low-level policy.

The method of FIG. 3 as well as a method for training a robot controller to perform this method may be performed by one or more computers including one or more data processing units. The term "data processing unit" can be understood as any type of entity that allows the processing of data or signals. For example, the data or signals may be treated according to at least one (i.e., one or more than one) specific function performed by the data processing unit. A data processing unit may include an analogue circuit, a digital circuit, a composite signal circuit, a logic circuit, a microprocessor, a micro controller, a central processing unit (CPU), a graphics processing unit (GPU), a digital signal processor (DSP), a programmable gate array (FPGA) integrated circuit or any combination thereof or be formed from it. Any other way of implementing the respective functions, which will be described in more detail below, may also be understood as data processing unit or logic circuitry. It will be understood that one or more of the method steps described in detail herein may be executed (e.g., implemented) by a data processing unit through one or more specific functions performed by the data processing unit.

The term "robot" can be understood to refer to any physical system (with a mechanical part whose movement is controlled), such as a computer-controlled machine, a vehicle, a household appliance, a power tool, a manufacturing machine, a personal assistant or an access control system.

Sensor data (i.e., observation data) may be data from pretty much any type of sensor, e.g., video, radar, LiDAR (light detection and ranging), ultrasonic, motion, thermal imaging camera etc.

Although specific example embodiments of the present invention have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for controlling a robot, comprising the following steps:
receiving an indication of a target configuration to be reached from an initial configuration of the robot;
determining a coarse-scale value map by value iteration, wherein transition probabilities of the coarse-scale value map are determined using a transition probability model mapping coarse-scale states and coarse-scale actions to transition probabilities for coarse-scale states; and
for each coarse-scale state of a sequence of coarse-scale states of the robot, starting from an initial coarse-scale state determined from the initial configuration of the robot and until the robot reaches the target configuration or a maximum number of fine-scale states has been reached:
determining a fine-scale sub-goal from the coarse-scale value map by selecting a coarse-scale action based on the coarse-scale value map using a greedy policy, and by transforming the selected coarse-scale action to the fine-scale subgoal, based on a current coarse-scale state,
performing, by an actuator of the robot, fine-scale control actions to reach the determined fine-scale sub-goal and obtaining sensor data to determine the fine-scale states reached as a result of performing the fine-scale control actions for each fine-scale state of a resulting sequence of fine-scale states of the robot, starting from a current fine-scale state of the robot and until the robot reaches the determined fine-scale sub-goal, the robot transitions to a different coarse-scale state, or a maximum sequence length of the sequence of fine-scale states has been reached, and
determining a next coarse-scale state of the sequence of coarse-scale states from a last fine-scale state of the sequence of fine-scale states.

2. The method of claim 1, wherein the transition probability model is a model trainable by supervised learning.

3. The method of claim 1, wherein the transition probability model is a neural network.

4. A robot controller configured to control a robot, the robot controller configured to:
receive an indication of a target configuration to be reached from an initial configuration of the robot;
determine a coarse-scale value map by value iteration, wherein transition probabilities of the coarse-scale value map are determined using a transition probability model mapping coarse-scale states and coarse-scale actions to transition probabilities for coarse-scale states; and
for each coarse-scale state of a sequence of coarse-scale states of the robot, starting from an initial coarse-scale state determined from the initial configuration of the robot and until the robot reaches the target configuration or a maximum number of fine-scale states has been reached:
determine a fine-scale sub-goal from the coarse-scale value map by selecting a coarse-scale action based on the coarse-scale value map using a greedy policy, and by transforming the selected coarse-scale action to the fine-scale subgoal, based on a current coarse-scale state,
cause an actuator of the robot to perform fine-scale control actions to reach the determined fine-scale sub-goal and obtaining sensor data to determine the fine-scale states reached as a result of performing the fine-scale control actions for each fine-scale state of a resulting sequence of fine-scale states of the robot, starting from a current fine-scale state of the robot and until the robot reaches the determined fine-scale sub-goal, the robot transitions to a different coarse-scale state, or a maximum sequence length of the sequence of fine-scale states has been reached, and
determine a next coarse-scale state of the sequence of coarse-scale states from a last fine-scale state of the sequence of fine-scale states.

5. A method for training a robot controller, the robot controller configured to: (i) receive an indication of a target configuration to be reached from an initial configuration of the robot, (ii) determine a coarse-scale value map by value iteration, wherein transition probabilities of the coarse-scale value map are determined using a transition probability model mapping coarse-scale states and coarse-scale actions to transition probabilities for coarse-scale states, and (iii) for each coarse-scale state of a sequence of coarse-scale states of the robot, starting from an initial coarse-scale state determined from the initial configuration of the robot and until the robot reaches the target configuration or a maximum number of fine-scale states has been reached: (a)

determine a fine-scale sub-goal from the coarse-scale value map by selecting a coarse-scale action based on the coarse-scale value map using a greedy policy, and by transforming the selected coarse-scale action to the fine-scale subgoal, based on a current coarse-scale state, (b) cause an actuator of the robot to perform fine-scale control actions to reach the determined fine-scale sub-goal and obtaining sensor data to determine the fine-scale states reached as a result of performing the fine-scale control actions for each fine-scale state of a resulting sequence of fine-scale states of the robot, starting from a current fine-scale state of the robot and until the robot reaches the determined fine-scale sub-goal, the robot transitions to a different coarse-scale state, or a maximum sequence length of the sequence of fine-scale states has been reached, and (c) determine a next coarse-scale state of the sequence of coarse-scale states from a last fine-scale state of the sequence of fine-scale states, the method comprising:

training the transition probability model using supervised learning and including training a fine-scale control policy via reinforcement learning that determines the fine-scale control actions to reach a sub-goal.

6. The method as recited in claim 5, further comprising training the transition probability model by maximizing a probability of the transition probability model to predict a coarse-scale state reached by fine-scale actions performed to reach a sub-goal.

7. A non-transitory computer-readable medium on which is stored a computer program including instructions for controlling a robot, the computer program, when executed by a computer, causing the computer to perform the following steps:

receiving an indication of a target configuration to be reached from an initial configuration of the robot;

determining a coarse-scale value map by value iteration, wherein transition probabilities of the coarse-scale value map are determined using a transition probability model mapping coarse-scale states and coarse-scale actions to transition probabilities for coarse-scale states; and for each coarse-scale state of a sequence of coarse-scale states of the robot, starting from an initial coarse-scale state determined from the initial configuration of the robot and until the robot reaches the target configuration or a maximum number of fine-scale states has been reached:

determining a fine-scale sub-goal from the coarse-scale value map by selecting a coarse-scale action based on the coarse-scale value map using a greedy policy, and by transforming the selected coarse-scale action to the fine-scale subgoal, based on a current coarse-scale state, causing an actuator of the robot to perform fine-scale control actions to reach the determined fine-scale sub-goal and obtaining sensor data to determine the fine-scale states reached as a result of performing the fine-scale control actions for each fine-scale state of a resulting sequence of fine-scale states of the robot, starting from a current fine-scale state of the robot and until the robot reaches the determined fine-scale sub-goal, the robot transitions to a different coarse-scale state, or a maximum sequence length of the sequence of fine-scale states has been reached, and determining a next coarse-scale state of the sequence of coarse-scale states from a last fine-scale state of the sequence of fine-scale states.

\* \* \* \* \*